(12) United States Patent
Menzel

(10) Patent No.: US 10,443,205 B2
(45) Date of Patent: Oct. 15, 2019

(54) CONCRETE FOUNDATION, METHOD FOR PRODUCING A CONCRETE FOUNDATION FOR A WIND POWER TOWER, AND POSITIONING DEVICE FOR POSITIONING JACKET PIPES IN A CONCRETE FOUNDATION

(71) Applicant: Max Bögl Wind AG, Sengenthal (DE)

(72) Inventor: Jürgen Menzel, Neumarkt (DE)

(73) Assignee: MAX BÖGL WIND AG, Sengenthal (DE)

( * ) Notice: Subject to any disclaimer, the term of this patent is extended or adjusted under 35 U.S.C. 154(b) by 581 days.

(21) Appl. No.: 14/893,612

(22) PCT Filed: May 28, 2014

(86) PCT No.: PCT/EP2014/001440
§ 371 (c)(1),
(2) Date: Nov. 24, 2015

(87) PCT Pub. No.: WO2014/191102
PCT Pub. Date: Dec. 4, 2014

(65) Prior Publication Data
US 2016/0108600 A1 Apr. 21, 2016

(30) Foreign Application Priority Data
May 29, 2013 (DE) .................. 10 2013 105 512

(51) Int. Cl.
*E02D 27/42* (2006.01)
*E02D 27/50* (2006.01)
(Continued)

(52) U.S. Cl.
CPC .......... *E02D 27/425* (2013.01); *E02D 27/42* (2013.01); *E02D 27/50* (2013.01); *E02D 31/00* (2013.01); *E04C 5/12* (2013.01); *F03D 13/22* (2016.05)

(58) Field of Classification Search
CPC ....... E02D 27/425; E02D 27/42; E02D 27/50; F03D 13/22; E04C 5/12
See application file for complete search history.

(56) References Cited

U.S. PATENT DOCUMENTS 2,374,624 A * 4/1945 Schwendt .............. E02D 27/01
52/169.9
4,406,094 A * 9/1983 Hempel .................. E02D 27/42
416/11
(Continued)

FOREIGN PATENT DOCUMENTS

AU 2002362779 B2 4/2003
CN 101634153 A 1/2010
(Continued)

OTHER PUBLICATIONS

International Search Report for International Application No. PCT/EP2014/001440, dated Mar. 12, 2014.
(Continued)

*Primary Examiner* — Paola Agudelo
(74) *Attorney, Agent, or Firm* — JK Intellectual Property Law, PA

(57) ABSTRACT

In a method for producing a concrete foundation for a wind power tower externally preloaded and made of precast concrete parts, a formwork for the concrete foundation is erected, core elements for producing passage openings in the concrete foundation for the loading elements are positioned and fixed on the formwork, and the concrete foundation is cast. A measurement reference system is established in order to position the core elements, at least one first positioning
(Continued)

aid having an adapter device for a core element and having at least one reference segment is provided on the formwork. A corresponding concrete foundation is produced in accordance with the described method. A positioning device for orienting core elements in a concrete foundation comprises at least one first positioning aid, which has an adapter device for a core element and at least one reference segment for calibrating the first positioning aid.

18 Claims, 5 Drawing Sheets

(51) Int. Cl.
*E02D 31/00* (2006.01)
*E04C 5/12* (2006.01)
*F03D 13/20* (2016.01)

(56) References Cited

U.S. PATENT DOCUMENTS

| | | | | |
|---|---|---|---|---|
| 5,379,563 | A * | 1/1995 | Tinsley | E02D 27/44 248/679 |
| 5,826,387 | A * | 10/1998 | Henderson | E02D 27/42 52/295 |
| 6,665,990 | B1 * | 12/2003 | Cody | E02D 27/42 405/244 |
| 8,051,627 | B2 * | 11/2011 | Schiffer | E02D 27/42 52/296 |
| 8,898,991 | B2 * | 12/2014 | Cai | E04H 12/08 52/651.01 |
| 9,234,364 | B2 * | 1/2016 | Abad Huber | E04H 12/12 |
| 9,322,396 | B2 * | 4/2016 | Coordes | E02D 27/42 |
| 2006/0048471 | A1 * | 3/2006 | Lee | E02D 27/00 52/296 |
| 2007/0107339 | A1 | 5/2007 | Matsumoto | |
| 2009/0000227 | A1 * | 1/2009 | Jakubowski | E04H 12/085 52/223.4 |
| 2011/0126481 | A1 * | 6/2011 | Stiesdal | E04H 12/16 52/146 |
| 2012/0266552 | A1 * | 10/2012 | Huynh Tong | E04H 12/16 52/223.4 |
| 2012/0272614 | A1 | 11/2012 | Perner et al. | |
| 2012/0311948 | A1 * | 12/2012 | Hangel | B66C 1/66 52/295 |
| 2013/0081350 | A1 * | 4/2013 | Bogl | E04H 12/08 52/651.01 |
| 2013/0125480 | A1 * | 5/2013 | Maestre | E02D 27/42 52/126.1 |
| 2013/0212963 | A1 * | 8/2013 | Miks | E04C 5/122 52/223.4 |
| 2014/0250806 | A1 * | 9/2014 | Schibsbye | E02D 27/42 52/223.13 |
| 2015/0143765 | A1 * | 5/2015 | Carril Gonzalez | F03D 11/045 52/296 |
| 2015/0247335 | A1 * | 9/2015 | Abad Huber | E04H 12/12 52/223.4 |
| 2015/0376859 | A1 * | 12/2015 | Phuly | F03D 13/22 52/223.1 |
| 2016/0108600 | A1 * | 4/2016 | Menzel | E02D 27/42 52/223.13 |
| 2017/0190391 | A1 * | 7/2017 | Siegfriedsen | B63B 21/50 |

FOREIGN PATENT DOCUMENTS

| | | |
|---|---|---|
| CN | 201459553 U | 5/2010 |
| CN | 202493386 U | 10/2012 |
| CN | 102767303 A | 11/2012 |
| DE | 101 26 912 A1 | 12/2002 |
| DE | 20 2009 013844 U1 | 2/2010 |
| DE | 201 22 941 U1 | 2/2011 |

OTHER PUBLICATIONS

English Translation of Chinese Office Action for Application No. 201480030848.7, dated Oct. 10, 2016.
Intellectual Property India, Examination Report dated Aug. 13, 2019 with translation therof.

* cited by examiner

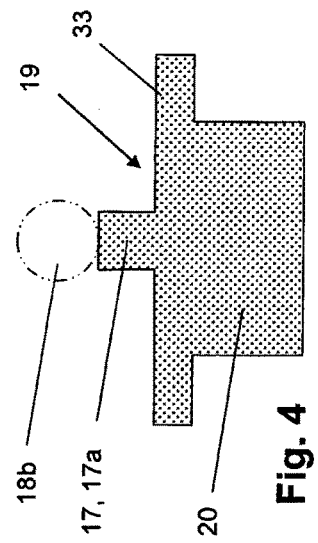
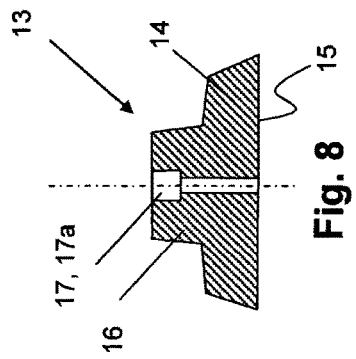
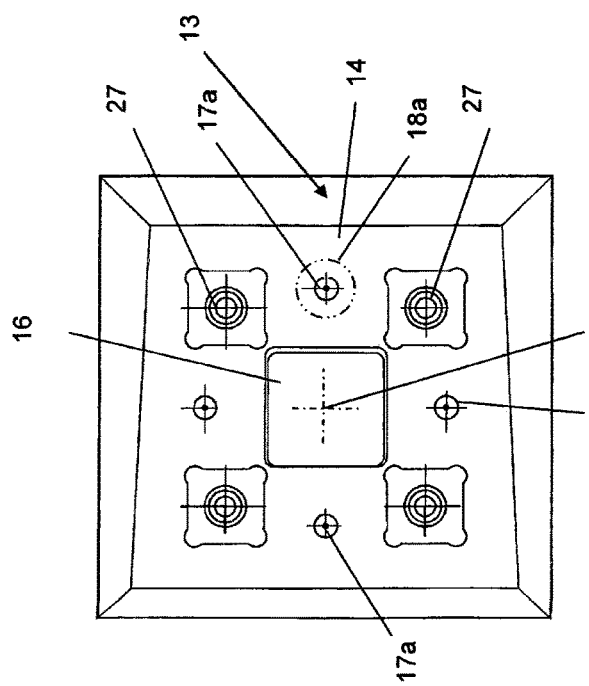
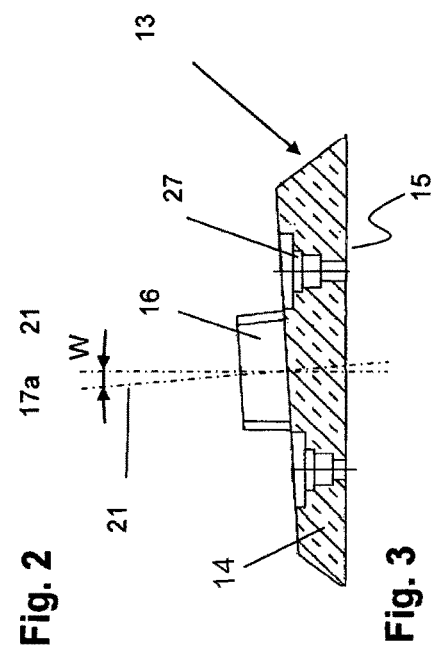

CONCRETE FOUNDATION, METHOD FOR PRODUCING A CONCRETE FOUNDATION FOR A WIND POWER TOWER, AND POSITIONING DEVICE FOR POSITIONING JACKET PIPES IN A CONCRETE FOUNDATION

CROSS-REFERENCE TO RELATED APPLICATIONS

This application is a national stage of International Application No. PCT/EP2014/001440, filed May 28, 2014 and claims benefit to German Patent Application No. 10 2013 105 512.5 filed May 29, 2013, both of which are incorporated by reference herein.

TECHNICAL FIELD

The present invention refers to a method for building a concrete foundation for a wind power tower pre-stressed by means of tendons, especially an externally pre-stressed wind power tower made of precast concrete parts in which a formwork for the concrete foundation is erected, in which core elements for making passage openings are positioned and fixed in place in the concrete foundation for the tendons on the formwork and into which the concrete foundation is cast afterwards. Moreover, the invention refers to a concrete foundation for a wind power tower pre-stressed by means of tendons and a positioning device for orienting core elements in a concrete foundation.

BACKGROUND

Various wind power tower designs made of prefabricated segments have become known in the state of the art. In these towers, the lowest tower segment and lowest tower section are connected in a stable manner with a separately made foundation so the occurring forces can be induced there. Thus, great importance is attached to the connection of the tower or lowest tower segment to the foundation. Therefore, when the foundation is made in in-situ concrete, the corresponding fastening devices for the wind power tower must be provided. For example, in wind power towers made of steel segments, it is known that an anchor cage with numerous threaded rods is embedded in the concrete foundation, on which later the tower's foot section with its fastening bore holes will be fastened. The anchor cage is prefabricated and matches the fastening points of the foot section.

For such a steel tower, DE 20 2009 013 844 U1 merely suggests casting in jacket pipes for individual tie bolts instead of the anchor cage. The positioning of the individual jacket pipes for the tie bolts takes place, in turn, with such an anchor cage. However, when tendons such as tensioning strands, tensioning wires or tensioning chords are used, a very exact orientation of the jacket pipes is necessary.

DE 101 26 912 A1 describes a wind power tower made of pre-stressed concrete, which is pre-stressed outside the tower's wall with tendons running between a top bearing and a foundation. The difficult adjustment of empty pipes in the formworks for the tower's wall described there can thus be dispensed with. This patent says nothing about the installation and orientation of jacket pipes in the foundation.

In practice, there are often problems when tendons are guided in tensioning channels. For example, if the axis deviates a little bit between the tendon and tensioning channel, there can already be bending during the guiding, and this damages the tendons. This occurs, for example, in transitional spots between two adjoining tensioning channel sections or between a freely tensed tendon section and one running in a tensioning channel. For this reason, the jacket pipes or tensioning channels are usually provided with funnel-shaped expansions in one end to reduce such bending. DE 201 22 941 U1 shows segments of a wind power tower whose tensioning channels are executed accordingly. The WO 00/14357 A2 also shows tensioning channels and jacket pipes with a funnel-shaped expansion in a tensioning channel.

SUMMARY

The task of the present invention is to improve a method of the type mentioned in the beginning and to suggest a positioning aid for core elements.

The task is solved with the characteristics of the disclosure.

In a method to produce a concrete foundation for a wind power tower pre-stressed with tendons, especially an externally pre-stressed wind power tower made of precast concrete parts, a formwork is erected for a concrete foundation. In this process, core elements to make passage openings in the concrete foundation for the tendons are positioned and fixed in the formwork and afterwards the concrete foundation is cast.

According to the invention, to position the core elements in the precise location and exactly, at least one first positioning aid with an adapter device for a core element and with at least one reference segment on the formwork is provided. The first positioning aid is positioned and fixed exactly in the formwork by means of the reference segment and the core element to be positioned is arranged on the adapter device of the positioning aid.

According to the present invention, by combining an adapter device for a core element with at least one reference segment in a positioning aid through the exact positioning of the positioning aid, the core element itself is also positioned so exactly in the formwork that no deviations or only very slight ones can occur later between the actual position of the core element and its target position. Thus, through this combination, and with an exactly oriented positioning aid, the core element is also automatically oriented in its intended fastening position, at least with its lower end in the precise and exact position. Here, a reference segment is understood to be a section of the positioning aid having a predefined position with regard to the adapter device so that the actual position of the core element can be determined by means of the reference segment(s). For example, the reference segment can be formed by a seat for a measuring body, especially a measuring sphere or a measuring prism. However, the reference segment can also be formed by a lay-on edge, a bearing surface or another device with which the positioning aid can be positioned on the formwork.

It is especially advantageous if a measurement reference system is installed for the positioning of the core elements, that at least one first positioning aid is calibrated in exact position in the measurement reference system with the target coordinates prescribed for the reference segment and fixed in the formwork, and at least the lower end of the core element to be positioned is placed in exact position in a prescribed fastening position by arranging it on the adapter device of the positioning aid.

Furthermore, the present invention provides for a concrete foundation that has jacket pipes for tendons cast into the concrete foundation for fastening the fastening positions intended for fastening the wind power tower, whereby the jacket pipes are executed as one-part jacket pipes with constant cross section. Since according to the present invention, the jacket pipes are positioned with very high accuracy in their target position, then contrary to known state-of-the-art jacket pipes, a funnel-shaped expansion in one end of the jacket pipes can be dispensed with and instead, one-part jacket pipes with constant cross section can be used. Contrary to jacket pipes with expansions, their one part can be made either of plastic or steel material, whereat economical semi-finished products can be used. In this case, the jacket pipes must only be lengthened to their intended length. As a result of this, both the manufacturing and mounting of the jacket pipes in the formwork can be greatly simplified. Likewise, no errors can appear in connecting points, as is the case with multi-part jacket pipes. Naturally, the method according to the invention can also be applied to position and cast in conventional jacket pipes with funnel-shaped expansions.

In a wind power tower, especially a wind power tower made of finished concrete parts that is preferably externally pre-stressed with tendons, and that has a concrete foundation made following the method according to the invention, an especially good guidance and anchoring of the tendons can be achieved. The transition between the freely running tendon sections and the sections running in the jacket pipes can be accomplished in an especially smooth way, so no more tendon damage can be feared.

In addition, to execute the method according to the invention and manufacture a concrete foundation according to the invention, a position device to orient core elements in a formwork is suggested that comprises at least one first positioning aid with an adapter device for a core element and at least one reference segment for calibrating the first positioning aid.

According to an advantageous execution of the invention, the first positioning aid of the positioning device has a solid body that has a flat installation surface on its underside and/or the adapter device and/or the at least one reference segment, especially a seat for a measuring body, incorporated into its upper side. Owing to the one-part fabrication of the positioning aid as solid body, the adapter device for the core element and the reference segment can be placed very exactly next to one another in it, so that assembly tolerances (as they occur if both parts are fabricated separately) no longer apply. Advantageously, a seat for a measuring reflector—particularly for a measuring sphere or measuring prism—is used as a reference segment, the measuring reflector being inserted into the seat when the first positioning aid is calibrated.

Preferably, the solid body is CNC-made, especially CNC-milled, to allow very accurate production. Here, owing to CNC production, possible deviations between the adapter device position and the reference segment are in a range below one tenth of a millimeter. Likewise, the installation surface on the underside has a very even surface and can thus serve for the height positioning of the positioning aid without further action.

According to an advantageous further development of the method according to the invention, an area around the passage openings is provided, to be executed in each case as an abutment for the tendons. Anchor plates, for example, can be braced in this area.

According to an advantageous further development of the method according to the invention, jacket pipes, which remain in the concrete foundation after it has been cast, are provided for use as core elements.

According to another advantageous further development, formwork cores are used as core elements, which are removed from the concrete foundation after it has been cast.

According to an advantageous further development of the method according to the invention, several reference segments are provided for the first positioning aid, and thus the latter can be calibrated in precise position with respect to several directions.

According to an advantageous further development of the method according to the invention, a first positioning aid is provided for each core element. The individual core elements can thus be installed independently from one another.

In the method for manufacturing a concrete foundation, it is preferable to erect one formwork, at least partially, by building at least one flat formwork bottom for a subsequent underside of the foundation. Here, a formwork bottom is a part of the formwork arranged horizontally. This formwork bottom is preferably oriented parallel to a reference plane of the measurement system and installed at its prescribed target height. Afterwards, the at least one positioning aid is provided on the formwork bottom, installed at its target height, and as a result of this, a bottom edge of the core element to be positioned is in each case positioned at its target height. Thus, to position the positioning device exactly, it is sufficient to place it on the formwork bottom installed at its target height by means of its installation surface.

In doing so, it is especially advantageous if one positioning device is provided in each fastening position, which is then also exactly positioned accordingly. However, it is likewise also possible to orient merely one part of the core elements in this fashion, or to combine core elements for tendons with other fastening elements.

Subsequently, the positioning aid placed at its target height with the help of at least two reference segments is positioned in its radial and angular target position and then fixed in place, whereby the core element to be positioned afterwards in each case is fixed to the adapter device, especially inserted or attached. Depending on the execution of the positioning aid and depending on the specifications for the position and orientation of the core elements, it can already be sufficient to provide two reference segments on the positioning aid and to calibrate and position the latter with the two reference segments.

Preferably, target coordinates are then prescribed for the reference segments, and the positioning aid is calibrated in the exact position according to the several prescribed target coordinates and fixed to the formwork. If at least three reference segments are provided on the positioning aid, then the positioning aid can be adjusted correctly in its target position, both with regard to its radial and angular target position as well as with regard to the inclination of its surface.

To fix the positioning aid to the formwork bottom, it is advantageous for the first positioning aid to have one fastening device, preferably at least two fastening bore holes, to fix the positioning aid to the formwork.

So the core elements can be subsequently oriented exactly according to their prescribed target position, it is advantageous for the positioning device to have a second positioning aid with a second adapter device for the core element and at least one reference segment. The second positioning aid is then fixed on place to the upper end of the core element to be positioned, especially placed on top of it or inserted in it, and the reference segment is used to orient the upper end of the core element and/or a core element longitudinal axis according to the prescribed orientation. In this case, the core element longitudinal axis is oriented exactly on the subsequent target course of the tendon longitudinal axis. Advantageously, the second positioning aid, as a reference segment, has a seat for a measuring reflector, especially for a measuring sphere or a measuring prism, in which case the measuring reflector is inserted in the seat during calibration of the upper end or the longitudinal axis of the core element to be positioned.

According to an advantageous further development of the method according to the invention, it is provided for the first positioning aid and/or the second positioning aid to have several reference segments and when the positioning aid is calibrated—and thus the core element as well—several of the reference segments are used. If seats are provided as reference segments for a measuring body, the measuring reflector is inserted successively in several seats. Preferably, at least the first positioning aid has three or four reference segments.

The core element longitudinal axis is preferably pivoted around an acute angle compared to the perpendicular in the direction of the foundation center. Here, the acute angle can be up to 15°, preferably around 5°. In a positioning aid, the at least first adapter device for the core element is oriented at an acute angle compared to a perpendicular on the underside installation surface of the first positioning aid. Thus, the orientation of the adapter device towards the underside installation surface corresponds already to the target course of the core element axis as soon as the positioning device is positioned in the fastening position. The work to calibrate and position the core element longitudinal axis can therefore be minimized even more.

Here, the position of the positioning aids and/or the position of the core elements is/are in each case calibrated and positioned with +/−2 mm accuracy, preferably +/−1 mm. Thus, through their simple insertion in their adapted device, the core elements are already in their correct position with regard to the bottom end and their axial direction must merely be slightly corrected subsequently.

In a positioning device, it is advantageous when the first and/or second adapter device for the core element is/are formed in each case by a projection protruding from the surface of the corresponding positioning aid on which the core element can be fixed in place, especially inserted, or that can be plugged into the jacket pipe. However, it is also conceivable to execute the adapter device as recess in the respective positioning aid in which the core element can then be inserted in its position.

It is furthermore advantageous if at least the second positioning aid is made of plastic material. As a result of this, the second positioning aid can be made very economically. The first positioning aid, on the other hand, is preferably made of steel material to allow precise machining of the seats and adapter device.

In a method for manufacturing a concrete foundation, it is furthermore advantageous if the reinforcement is fixed to the formwork and the core elements oriented in their prescribed axial direction are fixed to the formwork too before the jacket pipe longitudinal axes are oriented. Fixation parts can be used to accomplish this, which can be welded, clamped or screwed to the reinforcement. It is also conceivable, however, to connect the core elements directly to the reinforcement, for example to screw, weld or clamp them. Thus, in the ensuing concrete casting, no positional changes need to be feared any longer.

It is furthermore advantageous if, before the reinforcement is fixed in place, at least one formwork wall is erected on the first formwork bottom. Here, a formwork wall is a part of a formwork that is arranged upright. In this way, the reinforcement can be fixed in lateral direction so that the core elements fixed to it can also be maintained securely in their position during concreting.

If the jacket pipes are fully positioned with respect to their position and longitudinal axis and fixed in place in the formwork, then it is advantageous if a height position of an upper edge of the core elements is metrologically recorded in each case. As a result of this, the exact orientation of the core elements can be checked once again.

It is furthermore advantageous if during concreting of the foundation a maximum filling height of the formwork is determined from the height positions of the upper edges of the core elements. Preferably, the filling height is determined in such a way that the core elements are higher than the foundation surface by a certain space in the finished foundation.

Once the core elements have been fully oriented with respect to their position and longitudinal axis, the formwork is finally completed and the foundation cast. In this process, it is advantageous when at least the first positioning aid forms a part of the formwork during the casting of the foundation. Thus, the positioning aid remains together with the core element to prevent positional changes of the core element too while the concrete is being cast.

BRIEF DESCRIPTION OF THE DRAWINGS

More advantages of the invention are described by means of the embodiments shown below:

FIG. 2 is a top view of a first positioning aid of a positioning device according to the invention, FIG. 3 is a cutaway side view of the positioning aid of FIG. 2, FIG. 4 is a schematic cutaway view of a second positioning aid of a positioning device according to the invention, FIG. 8 is an alternative embodiment of a positioning aid.

DETAILED DESCRIPTION

Figure 1:
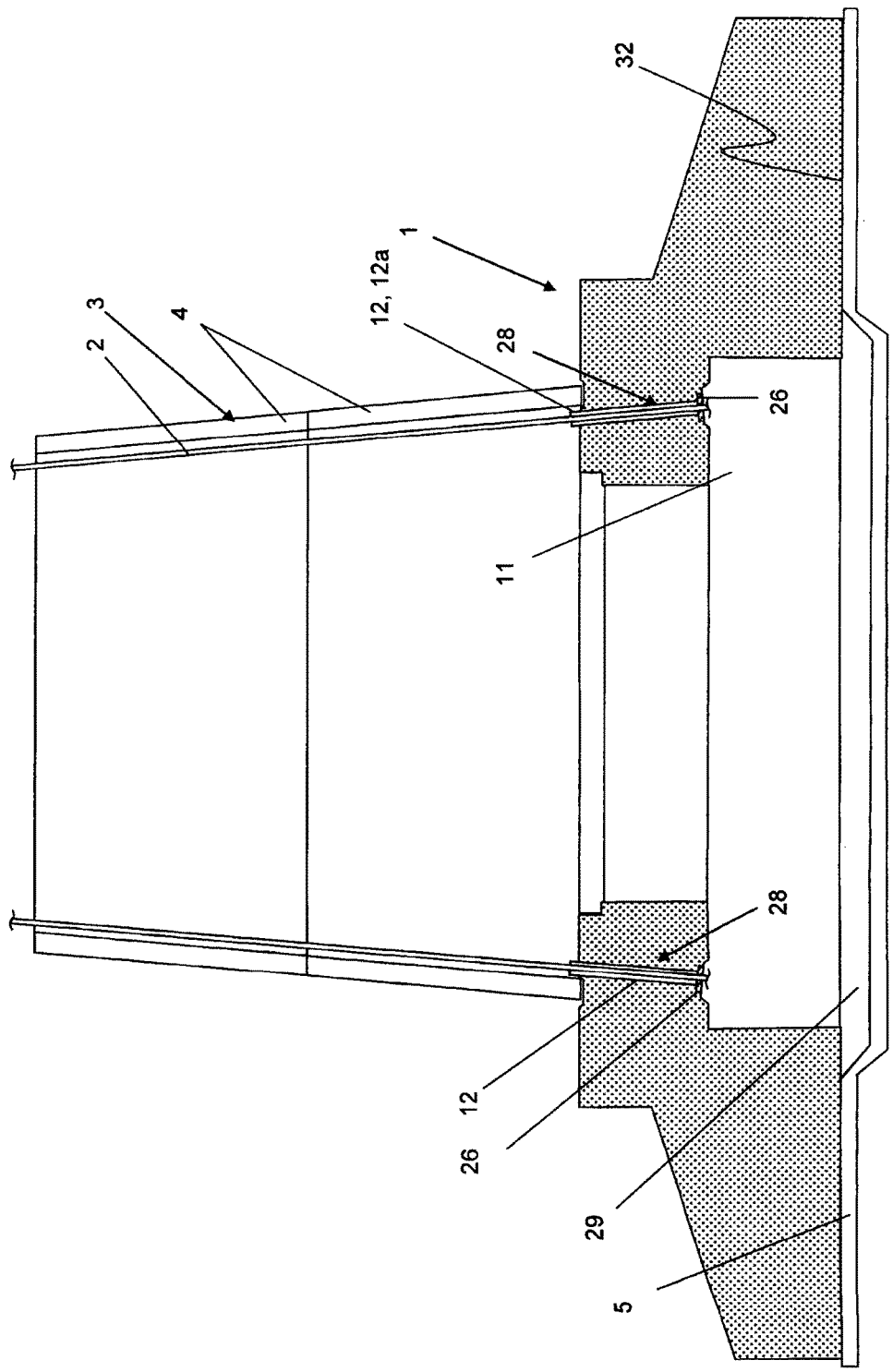
FIG. 1 is a schematic, cutaway drawing of a concrete foundation according to the invention for a wind power tower

FIG. 1 shows a schematic cutaway view of a concrete foundation 1 according to the invention for a wind power tower 3. According to this drawing, the wind power tower 3 consists of many ring-shaped or ring segment-shaped precast concrete parts 4 arranged on top and fastened with one another as well as to the foundation 1 with tendons 2. According to the present drawing, the tendons 2 run externally, i.e. outside of the concrete cross section of the precast concrete parts 4. However, the invention is also suitable for wind power towers 3 whose tendons 2 run in tensioning channels inside the concrete cross section. All known tendons, especially tensioning wires, tensioning steels, tensioning chords or tensioning strands, can be considered as tendons 2.

In the completed wind power tower 3, the tendons 2 extend from the foundation 1 to a head section of the wind power tower 3 (not shown here) and can be pre-stressed with a tensioning device (not shown here as well). To induce the tensioning forces of the tendons 2 securely into the concrete foundation, the tendons 2 are guided through passage openings that extend between an upper side and underside of the foundation 1 and fixed in place on the underside of the foundation 1. To accomplish this, the concrete foundation has a recess 11 on the underside that forms an abutment for the tendons 2 fixed in place there.

Figure 6A:
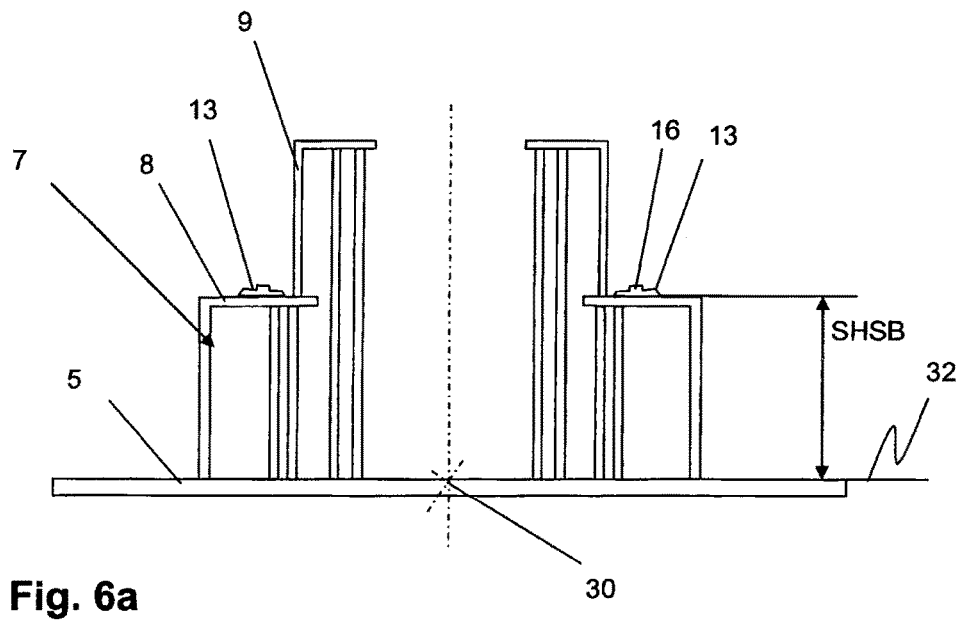
FIGS. 6a and 6b are additional steps of the method according to the invention to manufacture a concrete foundation.
Figure 6B:
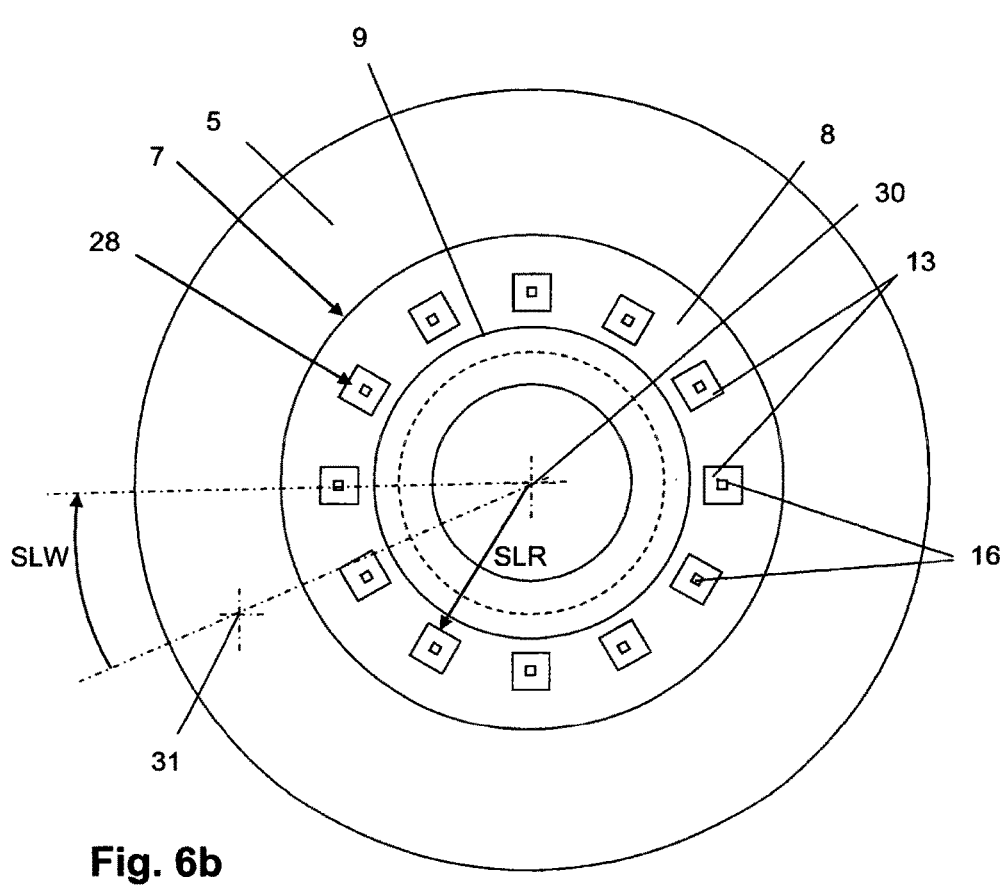

To fasten the wind power tower 3 to the foundation 1, many fastening positions 28 are provided, preferably distributed uniformly across the perimeter of the concrete foundation 1 (see also FIG. 6*b*). According to this embodiment, one core element 12 is now cast into the concrete foundation 1 in every one of the fastening positions 28 provided. In this process, the core elements 12 are oriented and positioned in the formwork in the fastening positions 28 provided for fastening the wind power tower 3 and, as a result of that, cast in the fastening positions 28 provided.

In the embodiments shown, the core elements 12 are hollow jacket pipes 12*a* that remain in the concrete foundation 1 after the latter has been cast. Alternately, formwork cores can be used as core elements 12, which are removed from the concrete foundation 1 after it has been cast.

In the embodiment, it is now provided to position the core elements 12 with such a high degree of accuracy in the formwork 7 (see FIGS. 5 and 6) and to cast them into the foundation with such high accuracy that it is possible to dispense with funnel-shaped expanded jacket pipes 12*a* or funnel-shaped expanded passage openings. Therefore, in the embodiment of the concrete foundation 1, jacket pipes 12*a* have been cast in as one-part jacket pipes 12*a* with a constant inner cross section. Such an exact casting in of the core elements 12 or jacket pipes 12*a* is made possible by a very exact positioning device. Here, the core elements 12 have been positioned with an accuracy of +/−1 mm in the formwork and afterwards cast with a correspondingly high accuracy of +/−1 mm into the concrete foundation 1.

Figure 5A:
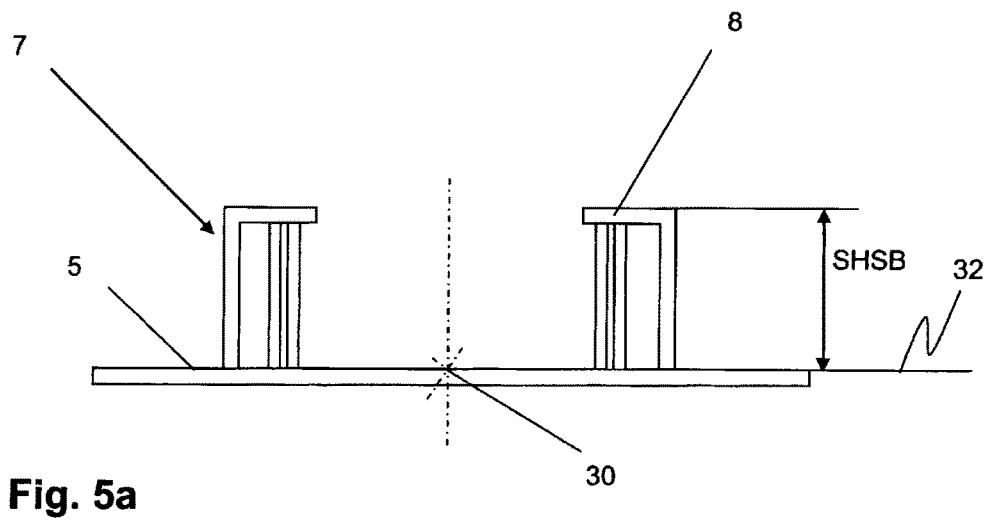
FIGS. 5a and 5b are drawings of a method according to the invention to manufacture a foundation in a first step.
Figure 5B:
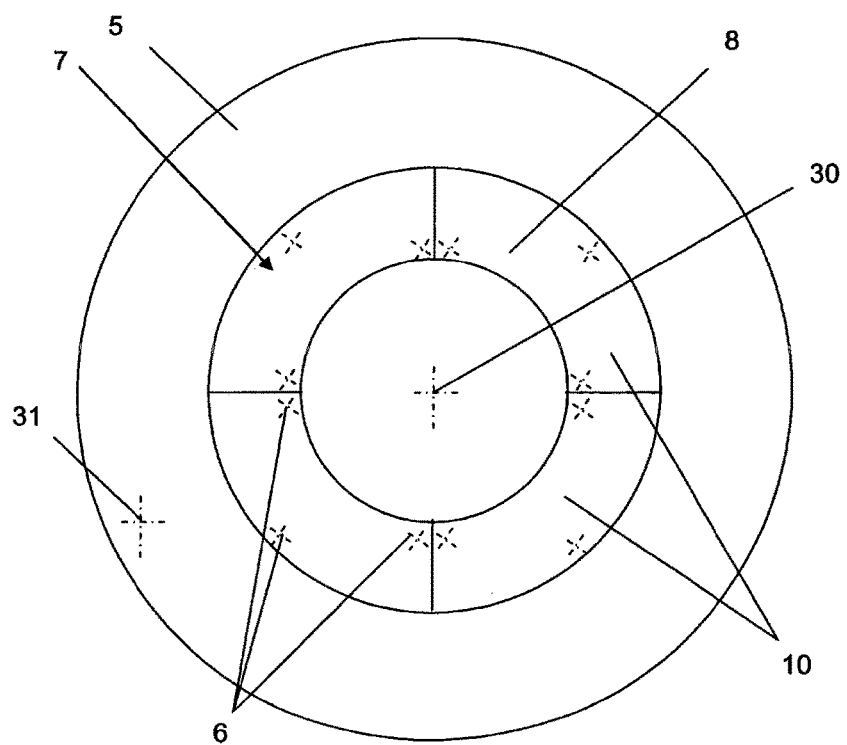

FIGS. 5*a*, 5*b* and 6*a*, 6*b* show various steps in the manufacturing of the foundation 1, each one in a schematic cutaway view (FIGS. 5*a*, 6*a*) and in a schematic top view (FIGS. 5*b*, 6*b*). To make the foundation, a granular sub-base 5 is made first on the ground in the area where the installation is being planned. A bottom plate 29 for the foundation 1, can also be made if need be. After completion of the granular sub-base 5, a measurement reference system is built (see FIG. 5*b*), which contains as measurement reference points, for example, a center 30 of the planned installation and another reference point 31, located radially far away from the center 30. The reference 31 can, for example, mark the direction of a door axis of the future wind power station. With the aid of the two reference points 30 and 31, the measurement reference system is now built with its calibration axes, thereby forming, for example, a height reference plane 32 of the measurement reference system through the upper edge of the granular sub-base 5.

After the granular sub-base 5 has been built and the measurement reference system has been set up, as shown in FIG. 5*a*, a formwork bottom 8 (which in the example shown forms the subsequent recess 11) is first erected on the upper edge of the granular sub-base 5. Here, the formwork bottom 8 can be made in the usual way and braced on the granular sub-base 5.

According to this method (shown here in FIGS. 5 and 6), the height positioning of the core elements 12 takes place not directly, but indirectly by arranging a positioning aid 13 that determines in each case the position of the core elements 12 (in this case jacket pipes 12*a*) with the help of an adapter device 16. Since the positioning aids 13 should be later positioned merely by placing them down on the formwork bottom 8 exactly at their target height SHSB, an exact height-wise installation of the formwork bottom 8 is therefore necessary as well. For this reason, the formwork bottom 8 is exactly leveled on its prescribed target height SH by means of several measurement points 6. According to the drawing shown in FIG. 5*b*, the formwork bottom 8 is made up of several segments 10, which are individually installed height-wise by means of several measurement points 6. In this case, merely four segments with just three measurement points are shown; however, depending on the size of the installation, considerably more segments 10 can also be provided. Likewise, depending on the size of the segments 10, several measurement points 6 can also be provided. Since the formwork 8 determines the height position of the positioning aids 13, the formwork bottom 8 has a large even surface.

As can be seen in FIG. 5*a*, the formwork bottom 8 is oriented parallel to the reference plane 32 of the measurement system. As a result of that, the arrangement of the first positioning aid 13 on the formwork bottom 8 is facilitated. In principle, however, it is also possible to build the formwork bottom 8 with an inclination.

FIGS. 6*a* and 6*b* show the provision of a positioning device with at least one first positioning aid 13 to orient the jacket pipes 12*a*. In this process, a positioning device is provided with at least one first positioning aid 13 on the formwork bottom 8 installed heightwise for a subsequent fastening of the fastening positions 28 provided for the wind power tower 3. In this case, one positioning aid 13 or one positioning device is provided for each fastening position 28. However, deviating from the drawing shown, a combination of tendons 2 with other types of fastening, such as anchors with anchor sleeves, is also conceivable. Each positioning aid 13 has one adapter device 16 for each core element 12, so that if the positioning aid 13 is correctly oriented by connecting the core element (in this example, a jacket pipe 12*a*) with the adapter device 16, at least one lower edge 22 of the core element 12 to be positioned is already exactly positioned at its target height SHUK.

FIG. 2 shows a top view of a first positioning aid 13 of a position device according to the invention and FIG. 3 shows a cutaway view of the positioning aid 13 of FIG. 2. In this case, the positioning aid 13 has the adapter device 16, here formed by a projection protruding from the surface of the positioning aid (FIG. 3). The cross section dimensions of the projection or adapter device 16 correspond here largely to those of the core element 12 provided, so that it can be connected to it by simple insertion in the adapter device 16. This drawing shows an adapter device 16 for a rectangular or square jacket pipe 12*a*. However, round jacket pipes 12*a* or core elements 12 with the corresponding round adapter devices 16 can also be considered.

Apart from the adapter device 16, the first positioning aid 13 has at least one reference segment 17, in this case a seat 17*a* for a measuring reflector 18. The positioning aid 13 seen here has four seats 17*a* for measuring reflectors 18, as a result of which an especially accurate orientation of the positioning aid 13 in its target position can take place. In the simplest case, the seats 17*a* for the measuring reflectors can be formed by bore holes. Furthermore, the first positioning aid 13 still has fastening bore holes 27, here four fastening bore holes 27, with which the exactly oriented positioning aid 13 can be fixed in its target position. The positioning aid 13 contains advantageously a solid body 14, in which the adapter device 16 and the at least one reference segment 17 have been incorporated as one single piece. On the underside, the solid body 14 has a flat installation surface 15, so that, after precise height-wise installation of the first formwork bottom 8 on its target height SHSB, the positioning aid 13 must only be placed on top of the formwork bottom 8. As a result of that, it is already positioned automatically at its correct target height, which corresponds to the target height SHSB of the formwork bottom 8.

FIG. 8 shows a variation of a first positioning aid 13, which also has an adapter device 16 for a core element 12 (as shown in FIG. 2), but here it contains merely one single seat 17a for a measuring reflector 18 as reference segment 17. At least when core elements 13 with round cross section are used, the only seat 17a found in the center makes it possible to already orient the positioning aid 13 correctly and thus the lower end of the core element 12. Here, the orientation of the adapter device 20 lies perpendicular to the lower installation surface 15. Nonetheless, after placing the core element 12 on top of the adapter device 16, the lower edge of the core element 12 is positioned with respect to its target height SHUK. The installation of the core element longitudinal axis 21 can take place by pivoting the core element 12 on the adapter device 20.

FIG. 6b now shows the partially erected formwork 7, in which a formwork wall 9 has already been mounted apart from the first formwork bottom 8. As can be seen in FIG. 6b, a first positioning aid 13 has been placed on top of every one of the fastening positions 28 provided and already positioned in radial and angular target position SLR and SLW.

To position the solid body 14 of the first positioning aid 13, a measuring reflector 18 (here a measuring sphere 18a indicated by a dot-dash line) is now inserted in the first seat 17a, the solid body 14 is installed by means of the target coordinates for the first seat 17a and fixed in place with respect to its position. Here, the target coordinates refer advantageously in each case to the center of a measuring sphere 18a located in the seat 17a. Afterwards, the measuring sphere 18a is inserted in the second seat 17a and the positioning aid 13 is installed and fixed in place on its target position using the target coordinates prescribed for the second seat 17a.

According to the example of FIG. 2, a total of four seats 17a are provided for a measuring sphere 18a, in which one measuring sphere 18a is inserted and measured in succession. Thus, one set of target coordinates is prescribed for each one of the four seats 17a. Since the solid bodies 14 are already at their target height SHSB, each set contains merely two target coordinates, which determine the radial position and angular position of the respective measurement body 18.

If correctly installed above the first and second seat 17a, the measurements for the third and fourth seat 17a serve merely for checking. After the positioning aid 13 is calibrated fully also with regard to its angular target position SLW and radial target position SLR and installed, it is finally fixed to the first formwork bottom 8 by means of a fastening device. According to the embodiment of a positioning aid 13 shown in FIG. 2, the fastening bore holes 27 are provided for it. Other fixing devices such as fixing parts, for example, which merely brace the external edges of the positioning device 13, are also possible, however.

After the positioning aids 13 have been fully installed, the formwork wall 9 is finally mounted, as shown in FIG. 6a. Finally, the core element 12 to be positioned can be arranged on the adapter device 16 with its lower end, inserted or placed on it, for example, so that the lower end of the core element 12 is already positioned in its target position with regard to angle and radius SLR and SLW and furthermore the bottom edge 22 is automatically also positioned at its target height SHUK (see also FIG. 7).

So the core element longitudinal axis 21 can now be oriented in its target position with regard to its angle W compared to the perpendicular, the positioning device comprises a second positioning aid 19. The orientation of the core element longitudinal axis 21 is shown schematically in a cutaway view in FIG. 7 and explained further below.

The second positioning aid 19 is shown in a schematic cutaway view in FIG. 4. The second positioning aid 19 also has an adapter device 20 for a core element 12, which is also executed here as a projection of the positioning aid 19 and also executed as projection of the positioning aid 19 here. As a result of that, in this example it can also be placed on the jacket pipe 12a or inserted in the jacket pipe with the help of the adapter device 20. The cross section of the adapter device 20 corresponds largely to the cross section of the jacket pipe 12a. After placing the second positioning aid 19 on top, a stop 33 lies next to the upper edge 23 of the jacket pipe 12a. In addition, the second positioning aid 19 also has a reference segment 17, here a seat 17a, for a measuring reflector 18 that can be, for example, a measuring prism 18b, which can be placed on top of the seat 17a of the second positioning aid 19. Variations in the shape of the second positioning aid 19 are possible. Thus, the positioning aid 19 could also have a recess as adapter device 20, so that the positioning aid 19 would be pluggable with its recess over the core element 12.

Figure 7:
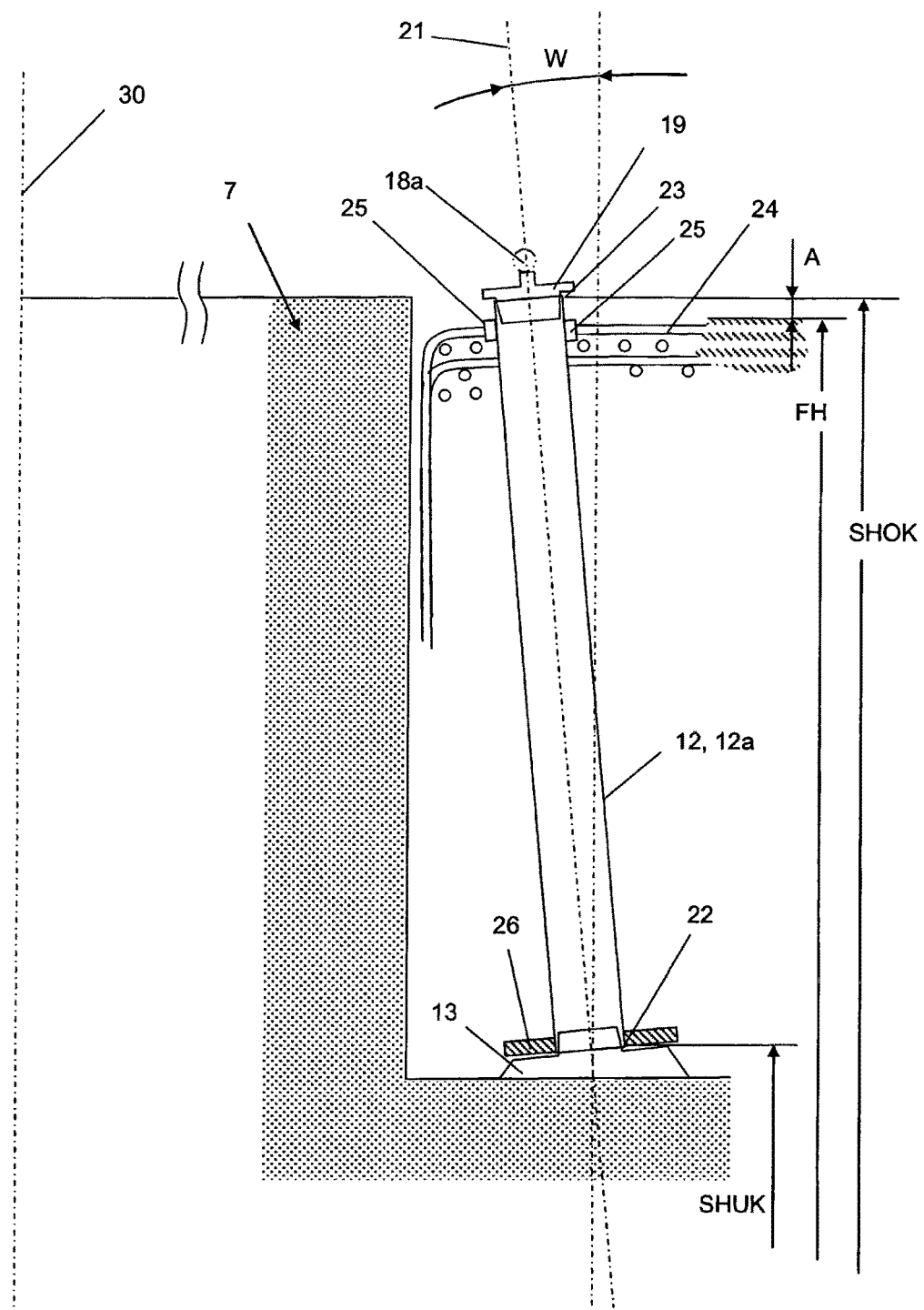
FIG. 7 is a schematic cutaway view of a core element fully positioned and oriented in a formwork.

The schematic cutaway view of FIG. 7 shows the setup of the core element longitudinal axis 21. After the core elements 12 have been plugged into the positioning aids 13, a reinforcement 24—shown here only partially for clarity reasons—is mounted on the formwork 7. It is advantageous if, as shown here, an anchor plate 26 is connected (e.g. welded) to the core element 12 already before the latter is plugged in. As a result of this, the plate is later cast on the correct place into the foundation 1 so a substantial force can be initiated in the foundation 1. FIG. 1 shows core elements 12 executed as jacket pipes 12a with the anchor plates 26 fastened to them in cast-in state.

The core element longitudinal axis 21 is now set up to its angle W compared to the perpendicular by means of the measuring reflector 18 with the help of the target coordinates prescribed for this measuring reflector 18, whereat owing to the angular position of the core element longitudinal axis 21 next to the radial target position SLR and the angular target position SLW of the measuring reflector 18, its height must also be considered. Therefore, for a measuring reflector 18 located in the seat 17a of the positioning aids 19, one set of target coordinates consisting of three coordinates is prescribed in each case. The installation of the core element 12 takes place initially in a first direction and the core element is already fixed to the reinforcement 24 with respect to this first direction. According to this drawing, fixation parts 25 are provided for this, placed on the outer edges of the core element 12 located in its target position and attached to the reinforcement (e.g. screwed, clamped or welded to it). However, the core element 12 can also be directly attached to the reinforcement (e.g. screwed, clamped or welded to it). If the core element 12 is made of steel, it can also be welded directly to the reinforcement 24 in its target position. In the second step, the setup of the core element longitudinal axis 21 can take place with regard to its second direction perpendicular to the first one. After the core element longitudinal axis 21 has been fully oriented, the core element 12 can, in turn, be fixed to the reinforcement 24 by means of additional fixation parts 25. Naturally, the fixation of the core elements 12 can also take place in this step in another way, as already described above.

The angle W of the core element longitudinal axis 21 compared to the perpendicular is here up to 15°, preferably about 5°, the core element axis 21 being pivoted in the direction of the foundation center 30 or the foundation middle axis, as shown here, and the formwork bottom 8 is installed flat and parallel to the height reference plane 32. Thus, it is advantageous if the orientation of the adapter device 16 already corresponds exactly to the subsequent position of the core element longitudinal axis 21 with regard to its angle W (cf. FIG. 3 too). After the core elements 12 are now fully positioned and fixed in place and the reinforcement 24 has been built in, the reinforcement is completed if still not done yet.

For the subsequent concreting of the concrete foundation 1, it is advantageous if the height of the upper edge of the core elements 12 SHOK is metrologically recorded and then a maximum filling height FH of the formwork 7 is determined from it. In this case, a distance A of several centimeters between the maximum filling height FH and the target height of the upper edge of the core elements 12 SHOK is provided. When the foundation 1 is concreted, the positioning aid 13 remains in the formwork 7, forming a part of it as a result of that. On the other hand, after the core element 12 has been positioned and fixed, the second positioning aid 19 can be taken out and reused in another location. After concreting and dismantling the formwork 7, the positioning aid 13 can be removed so that the anchor plate 26 now forms the lower edge of the foundation 1 in the fastening positions 28, as can be seen in FIG. 1, and can serve there for anchoring the tendons 2.

The location of the core elements 12 is measured and positioned by means of the method according to the invention and with the positioning aids according to the invention with an accuracy of +/−1 mm, so that core elements 12 can also be used now without funnel-shaped expansions in their ends. Due to the exact orientation of the core elements 12, there are no deviations or only very slight ones between the subsequent course of the tendon axis and the course of the axis of the passage openings. Bending and close fitting of the tendons 2 against the walls of the passage openings or the jacket pipe 12a can be largely prevented as a result of this, so that damages to the tendons 2 can no longer occur.

The invention is not restricted to the embodiments shown. As far as technically possible and useful, variations and combinations within the scope of the patent claims also fall under the invention.

The invention claimed is:

1. A method for manufacturing a concrete foundation for a wind power tower made of precast concrete parts prestressed with tendons, the method comprising the steps of:
    erecting a formwork for the concrete foundation;
    placing a first positioning aid on the formwork, the first positioning aid having an adapter device;
    placing core elements on the adapter device for making passage openings in the concrete foundation for receipt of the tendons, the first positioning aid having at least one reference segment having a seat for a measuring reflector;
    placing the measuring reflector on the seat;
    positioning the first positioning aid in a desired location on the formwork relative to reference points by determining when a center of the measuring reflector on the seat is at the desired location; and
    casting concrete to form the foundation in the formwork so that the passage openings are formed by the core elements.

2. A method according to claim 1, wherein a measuring reference system is set up for positioning the core elements, at least the first positioning aid is calibrated in the desired location via target coordinates in the measuring reference system prescribed for the reference segment and fixed in place in the formwork, and the respective core element to be positioned is positioned by arranging the respective core element on the adapter device of the positioning aid with a lower end on the desired location in a fastening position.

3. A method according to claim 2, wherein jacket pipes are used as core elements, and the jacket pipes remain in the concrete foundation after the concrete foundation has been cast.

4. A method according to claim 2, wherein the core elements are formwork cores which are removed from the concrete foundation after the casting step.

5. A method according to claim 2, wherein the first positioning aid has several reference segments used to calibrate the first positioning aid.

6. A method according to claim 1, wherein a respective first positioning aid is supplied for each core element.

7. A method according to claim 1, wherein at least one formwork bottom for the concrete foundation is erected parallel to a height reference plane of the measurement system, the formwork bottom being flat and being located at a first target height (SHSB) and at least one positioning aid is supplied on the formwork bottom built at the first target height (SHSB), a lower edge of each respective core element is positioned at a second target height (SHUK).

8. A method according to claim 7, wherein the positioning aid positioned at the first target height (SHSB) is positioned and then fixed in place in a radial (SLR) and angular target position (SLW) via two reference segments and wherein afterwards each respective core element is positioned on the corresponding adapter device.

9. A method according to claim 1, wherein the desired location is defined by target coordinates for the reference segments relative to the reference points, and the positioning aid is calibrated in the desired location according to the target coordinates prescribed for the reference segments and fixed in place in the formwork.

10. A method according to claim 9, wherein the target coordinates include a radial target position and an angular target position relative to the reference points.

11. A method according to claim 1, wherein a second positioning aid with a second adapter device is provided for each of the core elements, and at least one reference segment having a seat for a measuring reflector is fixed on an upper end of each respective core element, and at least one of the upper ends of the core elements and a core element longitudinal axis are oriented according to a prescribed angle (W), with respect to vertical direction, using the at least one reference segment.

12. A method according to claim 11, wherein before the core element longitudinal axes are oriented, a reinforcement is fixed in the formwork and the core elements oriented are fixed to the reinforcement.

13. A method according to claim 12, wherein before the reinforcement is fixed, at least one formwork wall is erected on the formwork bottom.

14. A method according to claim 11, wherein the core element axes are oriented so as to be pivoted up to 15° relative to the prescribed angle (W).

15. A method according to claim 11, wherein after the core elements have been fully positioned with respect to their position and on their core element axes, an actual height of an upper edge of each of the core elements is measured and, during the casting step a maximum filling height (FH) of the formwork is determined from the actual heights of the upper edges.

16. A method according to claim 11, wherein after the core elements have been fully oriented with respect to their position and their core element longitudinal axes, the formwork is completed and the concrete foundation is cast, with the first positioning aid forming a part of the formwork.

17. A method according to claim 11, wherein at least one of the first positioning aid and the second positioning aid has several seats for the measuring reflector, wherein to calibrate the at least one of the first and second positioning aid, the measuring reflector is inserted successively in the several seats.

18. A method according to claim 1, wherein at least one of a position of the positioning aid and a position of the core elements is calibrated with an accuracy of +/−2 mm.

* * * * *